(No Model.)  H. W. DOVER.  4 Sheets—Sheet 1.
GEAR CASE.
No. 601,505.  Patented Mar. 29, 1898.
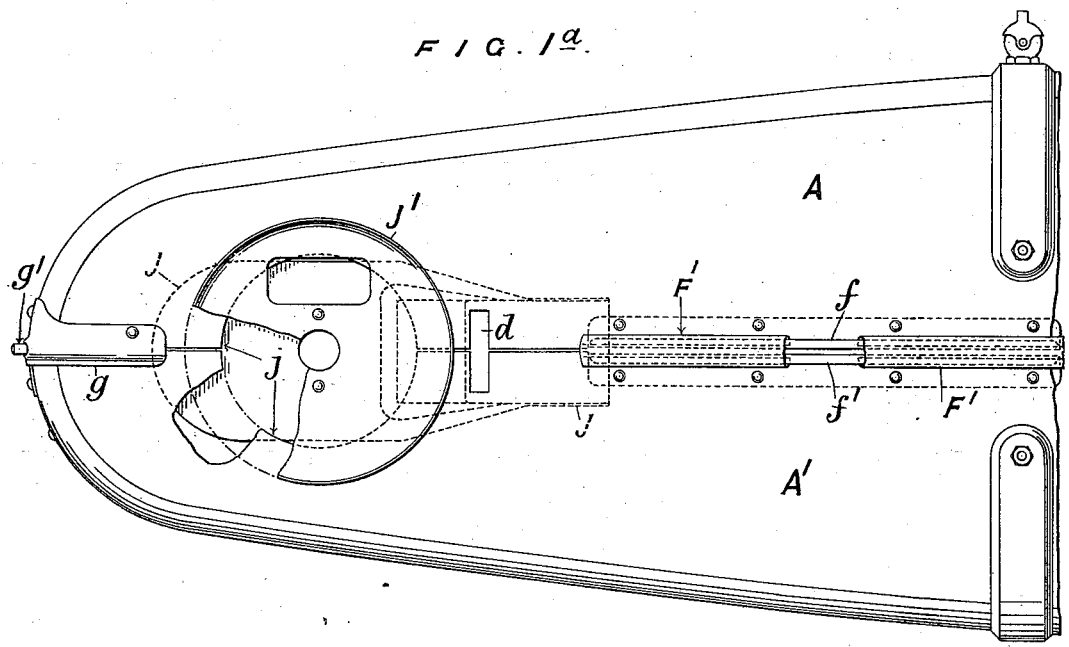
FIG. 1ª.
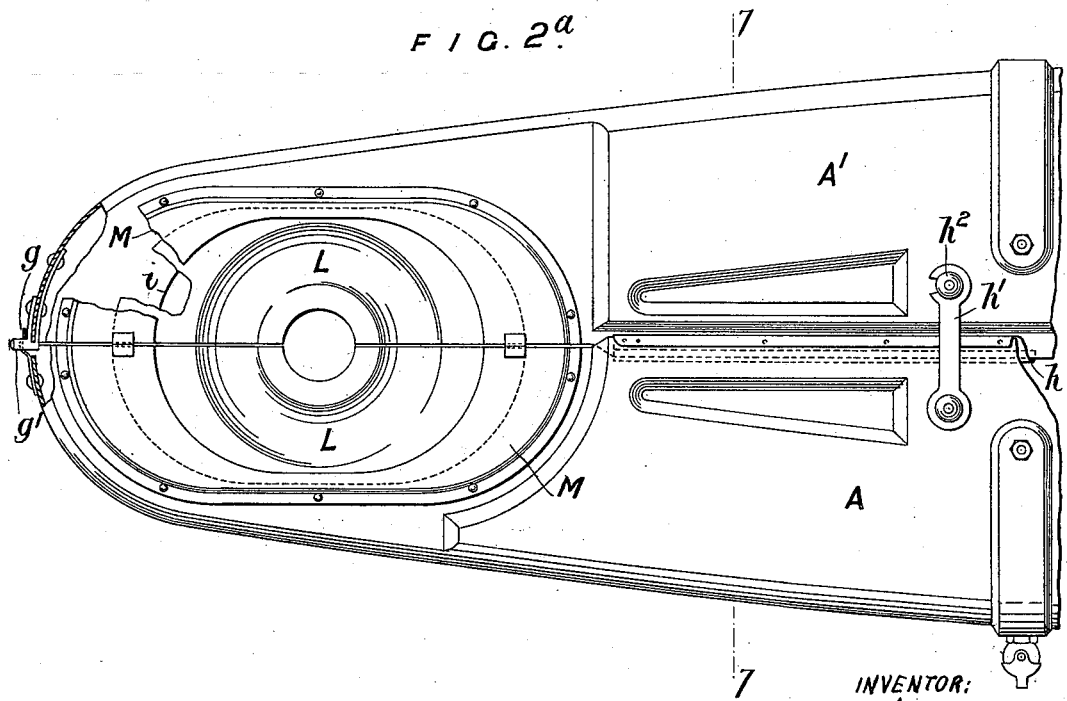
FIG. 2ª.
WITNESSES,
Julius Lutz
M. Hanaford
INVENTOR:
H. W. Dover
BY
[signature]
ATTORNEYS.

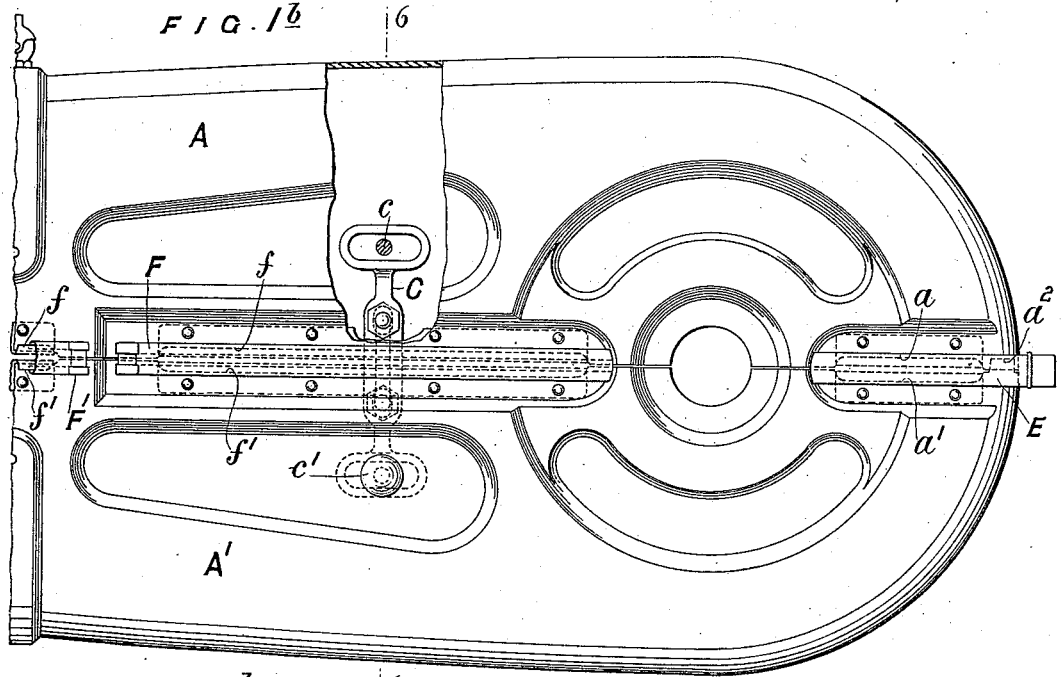
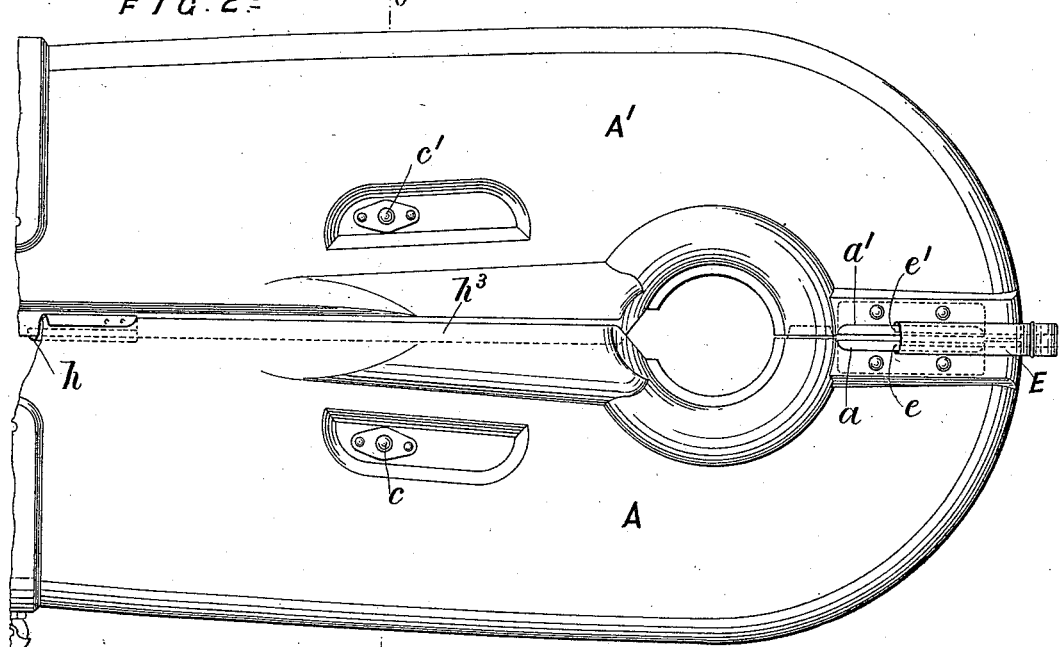

(No Model.)                    H. W. DOVER.                 4 Sheets—Sheet 3.
                                GEAR CASE.
No. 601,505.                              Patented Mar. 29, 1898.
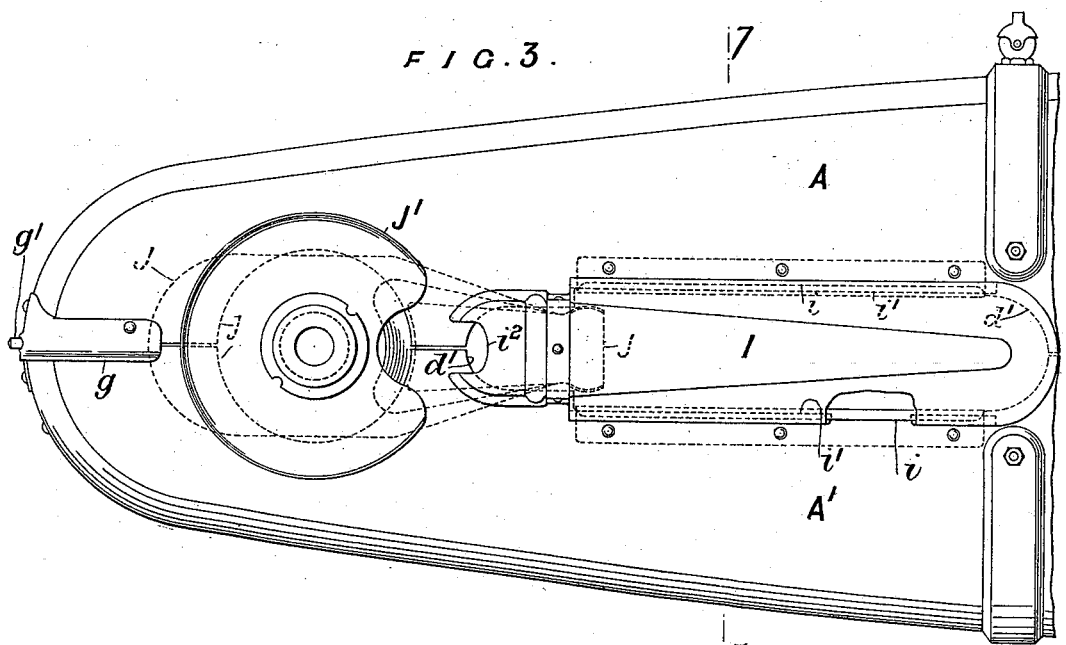
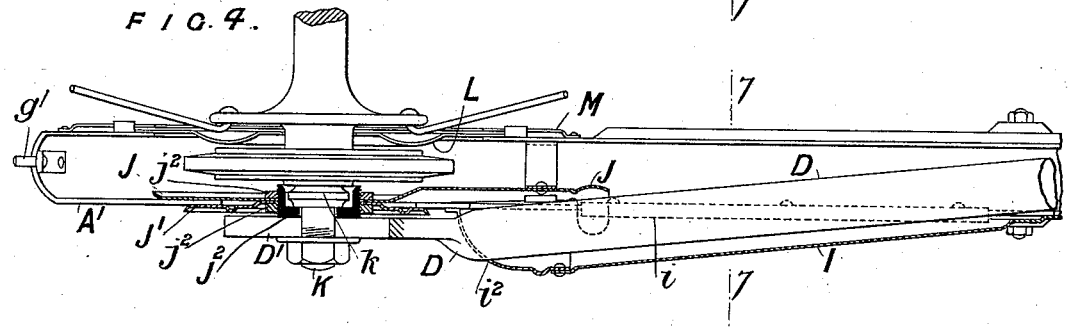
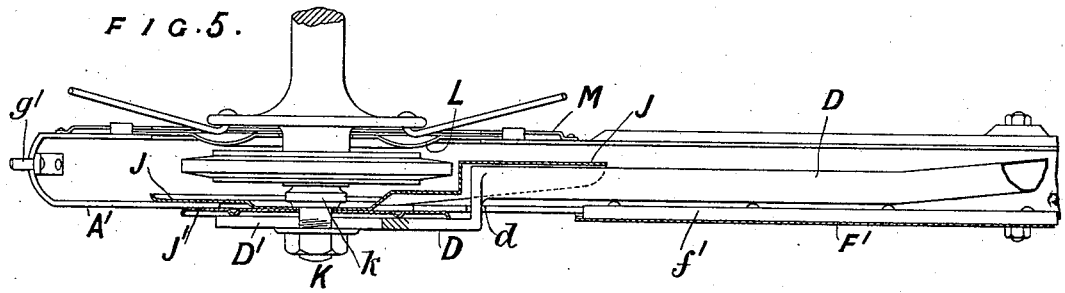
WITNESSES.                                INVENTOR.
                                          H. W. Dover.
                                      BY
                                          ATTORNEYS.

(No Model.) 4 Sheets—Sheet 4.

H. W. DOVER.
GEAR CASE.

No. 601,505. Patented Mar. 29, 1898.

WITNESSES.

INVENTOR:
H. W. Dover
BY
ATTORNEYS.

UNITED STATES PATENT OFFICE.

HORACE WALTER DOVER, OF NORTHAMPTON, ENGLAND.

GEAR-CASE.

SPECIFICATION forming part of Letters Patent No. 601,505, dated March 29, 1898.

Application filed November 10, 1896. Serial No. 611,620. (No model.) Patented in England October 4, 1892, No. 17,686.

*To all whom it may concern:*

Be it known that I, HORACE WALTER DOVER, engineer, of The Dorman Engineering Company, Mayorhold, Northampton, England, have invented new and useful Improvements in Gear-Cases, (for which I have obtained Letters Patent in the following country, namely: Great Britain, dated October 4, 1892, No. 17,686,) of which the following is a full, clear, and exact description.

My invention relates to an improvement in gear-cases for bicycles, and has for its object to enable the case to be easily applied and detached, the casing being divided at the plane of the crank and driving-wheel axles into halves, which are so united that while insuring a dust-proof closure the casing can be dismounted for cleaning, oiling, or repairs, and refixed in position with great facility.

The invention consists, essentially, in the means whereby the parts of the casing are united, and whereby, while affording the necessary facility for the adjustment of the chain-gearing, the entry of dust is prevented.

Reference is to be had to the accompanying drawings, forming part of this specification, wherein—

Figure 6:
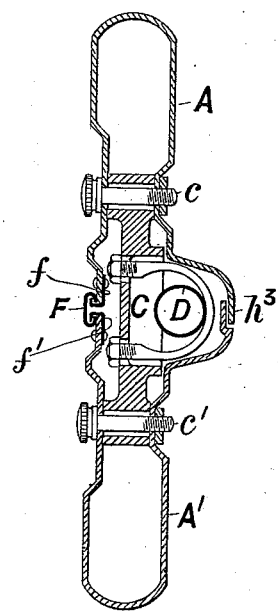
Figure 7:
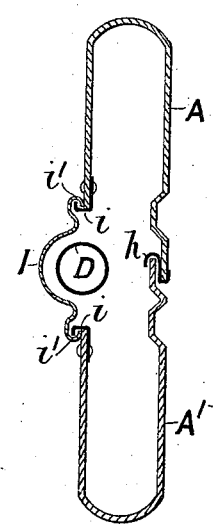
Figure 8:
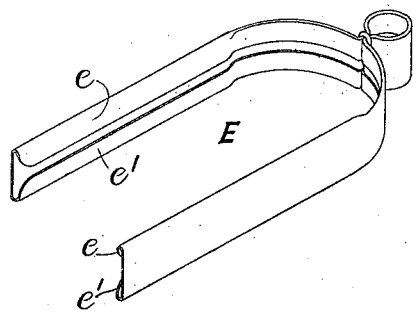

Figures $1^a$ and $1^b$ are elevations of the rear and forward portions, respectively, of the outer face of the casing, parts being broken away to show the construction. Figs. $2^a$ and $2^b$ are corresponding views, respectively, of the inner face inverted for convenience of comparison. Fig. 3 is a view similar to Fig. $1^a$, showing a modified arrangement. Fig. 4 is a plan of the same, taken at the plane of division between the halves of the casing, the upper half being removed. Fig. 5 is a similar plan, corresponding to Fig. $1^a$. Fig. 6 is a cross-section on line 6 6, Figs. $1^b$ and $2^b$. Fig. 7 is a cross-section on line 7 7, Figs. $2^a$, 3, and 4; and Fig. 8 is a perspective view of a detail drawn to a larger scale. In Figs. 4 and 5 the adjacent parts of the bicycle are shown. In the other figures the gear-case alone is shown.

The same letters of reference denote like parts in all the figures.

The casing is made in two parts A A', the joint or line of division being longitudinal and in a plane of the centers of the driving-wheel and crank-shaft. The casing is supported in position by transverse screws $c$ $c$, engaging with an internal bracket C, fixed to the rear leg or stay D of the frame, which passes through an aperture formed between the outer side of the two parts A A' of the case.

The two parts A A' are united by sliding clips of special form, which not only connect the two parts of the casing together, but form coverings for the joint or aperture between the parts, so as to insure a dust-tight closure. These sliding clips are provided at various points and are made of various shapes to suit the form of the case at the joints or aperture which they are designed to cover. For example, the two parts A A' are provided at the forward end of the case, Figs. $1^b$ and $2^b$, with flanges $a$ $a'$, of thin sheet metal, riveted to the case on the inside and outwardly recurved, so as to pass around the edges of the parts A A' and project at the outer face of the case in opposite directions from the joint. These oppositely-directed flanges $a$ $a'$ are embraced by a covering-clip E, which has inwardly-recurved flanges $e$ $e'$, adapted to be slid into interlocking engagement with the flanges $a$ $a'$ of the casing. These flanges are provided on both sides of the casing, but do not extend around the end of the casing, and the covering-clips E of the two sides of the casing are united to form a single piece of U shape, as shown separately in Fig. 8, so as to extend around and cover the joint at the rounded end of the casing, the limbs of this U-shaped clip being preferably of slightly-unequal length, so that they may be separately engaged with their respective flanges at the opposite sides of the casing, the clip being provided with a knob to enable it to be grasped and easily slid on or off. The joint at the front end of the casing besides being covered by the bow or rounded end of the U-shaped clip is made dust-proof by an internal lip $a^2$ on the part A', over which the part A fits. Outwardly-projecting and oppositely-recurved flanges $f$ $f'$ similar to $a$ $a'$ are provided on the abutting edges at the outer side of the casing, Fig. $1^b$, which flanges are embraced by a straight covering and interlocking clip F, having inwardly-recurved flanges adapted to engage with the flanges $f$ $f'$, the flanges $f$ $f'$ and clip F extending from the crank-axle bushing to a point about the middle of the length of the casing. The remainder of the joint from this point toward the driving-wheel axle is made by means of a similar clip varying in breadth and form according as the stay D of the machine-frame passes through the outer face of the casing at right angles or obliquely. When the rear end of the stay D is cranked, as indicated in Fig. 5, and passes by an aperture, as at $d$, Fig. 1$^a$, through the outer side of the gear-case, at right angles thereto, the second clip, F', is exactly similar to the first one, F; but to enable the clip F' to pass clear of the knob-handle of clip F the casing is countersunk, as shown in Figs. 1$^b$ and 6, at the part where the clip F is situated. When, however, the stay D passes obliquely through the casing, as indicated in Fig. 4, the aperture through which it passes is necessarily of considerable length and breadth, as at $d'$, Fig. 3, and the clip F' is replaced by a covering-plate I, which fulfils the same function as the clip F' so far as regards uniting the two parts of the case and covering the intervening space, besides giving passage to the stay D. This covering-plate I is of convex form in cross-section, provided with inwardly-recurved flanges $i'\,i'$, which embrace and engage with oppositely-directed flanges $i\,i$, riveted to the parts A A' along the edges of the aperture $d'$, the cover I not only closing said aperture, but serving to assist in uniting the two parts A A' of the case when it is slid into engagement with the flanges $i\,i$. The convex cross-sectional form of this cover-plate enables it to inclose the whole of the partially-projecting part of the stay D, which intersects the plane of the outer side of the case, the convex end portion $i^2$ of the cover-plate (which portion may be made of celluloid) being shaped to fit snugly around the stay where the latter finally emerges from the case.

At the rear end of the casing the rounded end of the upper part A has a lip $g$, of sheet metal, riveted to it, which overlaps the edge of the lower half A' and has a hole in which a stud $g'$ on the lower part engages.

At the side of the casing next the wheel, where it is not possible to apply sliding interlocking clips such as above described, a lip $h$ is riveted to the straight rear portion of the upper half A and embraces the edge of the lower half A', as shown in Figs. 2$^a$, 2$^b$, and 7, a hook $h'$, pivoted to A and engaging with a stud $h^2$ on A', serving to hold the halves together. The forward portion of this side of the case is so shaped as to fit snugly around the bottom bracket D' of the frame and also to inclose the forward portion of the stay D, the edges of A and A' being jointed throughout this part of the casing by the upper half A having a lip which closely overlaps a lip on the lower half A', as shown at $h^3$ in Figs. 2$^b$ and 6.

At the forward end the case itself fits around the bottom bracket and crank-shaft, while at the rear hub provision is made for maintaining a dust-tight closure while admitting of adjustment of the driving-chain, as follows: At the outer side the case has a large circular aperture $j$, which is closed by a pair of corrugated spring-metal plates J J' upon the driving-wheel axle K, between which plates the edges of the aperture $j$ in the casing are received sufficiently to allow of the alteration of the relative position of the plates and casing to the extent necessary for the chain adjustment. The inner plate J is forwardly prolonged and is adapted to clip the stay D, as shown. The plates are clamped between the back fork D' and the cone-bearing $k$ of the driving-wheel either directly, as in Fig. 5, or through the medium of a screw-threaded boss J$^2$, on which collars $j^2$ screw, as in Fig. 4.

At the opposite side of the case a joint is made by two plates L, shaped to fit closely around the end of the driving-wheel hub and covering an oblong aperture $l$, formed between the parts A A' of the case. The plates L are retained in position by cover-plates M, riveted to the outside of the parts A A', the cover-plates M corresponding in form to the parts A A' and the plates L being able to slide beneath the cover-plates to the required extent of the chain adjustment.

I claim—

1. In a bicycle gear-case, made in two parts divided in the plane of the crank-shaft, and having outwardly and oppositely projecting flanges at each side of the front end of the case, the combination in a single U-shaped piece of two sliding clips, each having inwardly and oppositely directed flanges adapted to enter into sliding and interlocking engagement with the outwardly-directed flanges at the two sides of the case, the U-shaped piece being adapted to also cover the joint at the end of the case, as specified.

2. In a bicycle gear-case, made in two parts and having an intervening aperture to give passage to the backstay of the frame, the combination, with outwardly and oppositely projecting flanges along the edges of said aperture, of a sliding clip provided with inwardly and oppositely directed flanges adapted to enter into sliding and interlocking engagement with the flanges on the case, so as to unite the two parts of the case, the clip being also adapted to form a cover-plate for the aperture giving passage to the stay, as described.

3. The combination, with the casing constructed as described, of a pair of metal plates adapted to receive the edges of the casing between them, and of plates fitting around the hub and free to slide between the casing and cover-plates attached thereto, so as to form a dust-tight closure for said aperture and afford freedom for adjustment of the chain-tension, as specified.

4. A gear-case having two approximately parallel sides and formed of two sections, the contiguous edges of the sections running through the sides and respectively having flanges, and a sliding clip approximately U-shaped in form and embracing the gear-case to lie at each side thereof, the clip having inwardly-bent flanges respectively engaging the flanges of the sections of the gear-case to hold the two sections together, substantially as described.

5. A gear-case having an orifice through which an axle may be passed, two closure-plates respectively lying inside and outside of the gear-case and holding the edges of the orifice between them, and a clip formed on the inner of the closure-plates and adapted to engage a stationary portion to support the plates, substantially as described.

6. A gear-case formed of two sections, the contiguous edges of which are recessed to permit a portion of a frame to project through the gear-case, and a plate having portions locking with the contiguous edges of the sections of the gear-case to hold the sections of the gear-case in connection and also extending over the said portion of the frame to form a closure for the orifice through which the said portion of a frame may pass, substantially as described.

7. A case for receiving sprocket-wheels and chain-gearing, the case being formed of two longitudinal sections having their meeting edges arranged in the common plane of the crank and wheel axles and having recesses through which the axles may extend, a part of said meeting edges of the sections of the case at a point between the axles being provided with flanges which extend back from said edges and which run parallel with the flat faces of the respective sections, and the case also having two clip-plates with longitudinal internal faces capable of engaging the flanges of the sections to hold the sections together, and each section having a countersunk or indented portion adjacent to the said meeting edges and matching with each other, one of the clip-plates being located in said countersunk or indented portion and the other of the clip-plates being located without the same, whereby the clip-plates may be placed and displaced.

HORACE WALTER DOVER.

In presence of—
WILLIAM TRIMMER,
T. W. KENNARD.